(12) United States Patent
Alexander et al.

(10) Patent No.: US 9,008,584 B2
(45) Date of Patent: Apr. 14, 2015

(54) ENVIRONMENT ESTIMATION IN A WIRELESS COMMUNICATION SYSTEM

(75) Inventors: Paul Dean Alexander, Crafers (AU); David Victor Lawrie Haley, Stepney (AU); Alexander James Grant, North Adelaide (AU)

(73) Assignee: Cohda Wireless Pty. Ltd. (AU)

( * ) Notice: Subject to any disclaimer, the term of this patent is extended or adjusted under 35 U.S.C. 154(b) by 614 days.

(21) Appl. No.: 13/379,295

(22) PCT Filed: Jun. 18, 2010

(86) PCT No.: PCT/AU2010/000768
§ 371 (c)(1),
(2), (4) Date: Apr. 24, 2012

(87) PCT Pub. No.: WO2010/144973
PCT Pub. Date: Dec. 23, 2010

(65) Prior Publication Data
US 2012/0196541 A1    Aug. 2, 2012

(30) Foreign Application Priority Data

Jun. 19, 2009    (AU) .................................. 2009902848

(51) Int. Cl.
| | | |
|---|---|---|
| *H04W 24/00* | (2009.01) | |
| *G01S 13/00* | (2006.01) | |
| *G01S 13/93* | (2006.01) | |

(52) U.S. Cl.
CPC ............ *G01S 13/003* (2013.01); *G01S 13/931* (2013.01); *G01S 2013/9339* (2013.01); *G01S 2013/9353* (2013.01)

(58) Field of Classification Search
CPC .............................. H04W 24/00; H04B 17/042
USPC ........................................................ 455/67.11
See application file for complete search history.

(56) References Cited

U.S. PATENT DOCUMENTS 6,133,876 A *  10/2000  Fullerton et al. .............. 342/375
6,249,252 B1    6/2001  Dupray
(Continued)

FOREIGN PATENT DOCUMENTS

| WO | WO-03/094037 A1 | 11/2003 |
|---|---|---|
| WO | WO-2005/011128 A1 | 2/2005 |

(Continued)

OTHER PUBLICATIONS

"European Application No. 10788518.8, Extended European Search Report dated Oct. 29, 2012", 7 pgs.

(Continued)

*Primary Examiner* — Hai V Nguyen
(74) *Attorney, Agent, or Firm* — Schwegman Lundberg & Woessner, P.A.

(57) ABSTRACT

A method and system are described for estimating an environment surrounding a wireless communication system, the environment including at least one inflector that inflects transmitted signals. An observation generator receives an input signal transmitted from a transmitter to a receiver via a wireless communication channel and also receives system state information pertaining to at least one of the receiver, the transmitter and the inflector. An observation processor uses observations from the observation generator to estimate at least one property of the inflector based on the received input signal and the system state information.

58 Claims, 6 Drawing Sheets

(56) References Cited

U.S. PATENT DOCUMENTS

| | | | |
|---|---|---|---|
| 6,493,329 B1 | 12/2002 | Leung | |
| 6,501,950 B1* | 12/2002 | Smith et al. | 455/423 |
| 6,614,384 B2* | 9/2003 | Hall et al. | 342/28 |
| 6,822,604 B2* | 11/2004 | Hall et al. | 342/28 |
| 6,839,574 B2 | 1/2005 | Petrus et al. | |
| 6,999,725 B2* | 2/2006 | Nitta et al. | 455/63.1 |
| 7,028,097 B2* | 4/2006 | Bard | 709/232 |
| 7,102,537 B2* | 9/2006 | Inoue et al. | 340/903 |
| 7,129,886 B2* | 10/2006 | Hall et al. | 342/28 |
| 7,130,243 B2* | 10/2006 | Koets | 367/87 |
| 7,199,750 B2* | 4/2007 | Bourdelais et al. | 342/90 |
| 7,277,052 B2* | 10/2007 | Delaveau et al. | 342/387 |
| 7,474,256 B2* | 1/2009 | Ohta et al. | 342/146 |
| 7,525,939 B2* | 4/2009 | Abe et al. | 370/328 |
| 7,541,968 B2* | 6/2009 | Hall et al. | 342/28 |
| 7,668,504 B2* | 2/2010 | Kang et al. | 455/11.1 |
| 7,702,280 B2* | 4/2010 | Takeda et al. | 455/7 |
| 7,933,549 B2* | 4/2011 | Larsson | 455/7 |
| 8,077,757 B2* | 12/2011 | Maravic et al. | 375/148 |
| 8,089,970 B2* | 1/2012 | Ramprashad et al. | 370/395.53 |
| 8,103,228 B2* | 1/2012 | Monat et al. | 455/130 |
| 8,217,827 B2* | 7/2012 | Hayward et al. | 342/28 |
| 8,254,928 B2* | 8/2012 | Watanabe et al. | 455/436 |
| 8,289,159 B2* | 10/2012 | Julian et al. | 340/539.32 |
| 8,416,729 B2* | 4/2013 | Lo et al. | 370/315 |
| 8,446,311 B2* | 5/2013 | Ricci et al. | 342/28 |
| 8,456,304 B2* | 6/2013 | van Doorn et al. | 340/541 |
| 8,483,669 B2* | 7/2013 | Manolescu et al. | 455/414.1 |
| 8,610,771 B2* | 12/2013 | Leung et al. | 348/143 |
| 8,723,721 B2* | 5/2014 | Moruzzis et al. | 342/59 |
| 8,730,088 B2* | 5/2014 | Milligan et al. | 342/57 |
| 8,731,829 B2* | 5/2014 | Moriguchi et al. | 701/519 |
| 8,762,082 B2* | 6/2014 | Nishida | 702/60 |
| 8,862,111 B2* | 10/2014 | Seo et al. | 455/418 |
| 2005/0003827 A1* | 1/2005 | Whelan | 455/454 |
| 2005/0083199 A1* | 4/2005 | Hall et al. | 340/552 |
| 2005/0197136 A1* | 9/2005 | Friday et al. | 455/456.1 |
| 2006/0040656 A1* | 2/2006 | Kotzin | 455/426.2 |
| 2006/0115953 A1* | 6/2006 | Lee | 438/396 |
| 2006/0116128 A1* | 6/2006 | Benveniste | 455/445 |
| 2006/0238407 A1* | 10/2006 | Bourdelais et al. | 342/90 |
| 2006/0262876 A1* | 11/2006 | LaDue | 375/295 |
| 2007/0036353 A1* | 2/2007 | Reznik et al. | 380/30 |
| 2007/0086529 A1* | 4/2007 | Krishnasawamy et al. | 375/241 |
| 2007/0147240 A1* | 6/2007 | Benveniste | 370/230 |
| 2007/0249366 A1* | 10/2007 | Thomson et al. | 455/456.1 |
| 2007/0280152 A1* | 12/2007 | Thomson et al. | 370/328 |
| 2007/0287473 A1* | 12/2007 | Dupray | 455/456.1 |
| 2008/0012768 A1* | 1/2008 | Eberlein | 342/464 |
| 2008/0031202 A1* | 2/2008 | Benveniste | 370/338 |
| 2008/0049678 A1* | 2/2008 | Chindapol et al. | 370/331 |
| 2009/0009340 A1* | 1/2009 | Weaver et al. | 340/573.1 |
| 2009/0010215 A1* | 1/2009 | Kim et al. | 370/329 |
| 2009/0104911 A1* | 4/2009 | Watanabe et al. | 455/436 |
| 2009/0271864 A1* | 10/2009 | Dietrich et al. | 726/23 |
| 2009/0323686 A1* | 12/2009 | Dyck et al. | 370/389 |
| 2010/0022255 A1* | 1/2010 | Singhal | 455/457 |
| 2010/0123575 A1* | 5/2010 | Mittal et al. | 340/540 |
| 2010/0207804 A1* | 8/2010 | Hayward et al. | 342/28 |
| 2011/0038276 A1* | 2/2011 | Ninagawa | 370/252 |
| 2012/0026029 A1* | 2/2012 | Rudland et al. | 342/28 |
| 2012/0047444 A1* | 2/2012 | Adar et al. | 715/745 |
| 2012/0095682 A1* | 4/2012 | Wilson | 701/532 |
| 2012/0109398 A1* | 5/2012 | Bhakta | 700/295 |
| 2012/0225665 A1* | 9/2012 | Alexander et al. | 455/456.1 |
| 2013/0094620 A1* | 4/2013 | Alexander et al. | 375/343 |
| 2013/0295854 A1* | 11/2013 | Olson et al. | 455/67.11 |

FOREIGN PATENT DOCUMENTS

| | | |
|---|---|---|
| WO | WO-2006/113617 A2 | 10/2006 |
| WO | WO-2007/022564 A1 | 3/2007 |
| WO | WO-2007/083902 A1 | 7/2007 |
| WO | WO-2007/095697 A1 | 8/2007 |
| WO | WO-2008/040088 A1 | 4/2008 |
| WO | WO-2009/047546 A1 | 4/2009 |

OTHER PUBLICATIONS

"International Application No. PCT/AU2010/000768, International Preliminary Report on Patentability mailed Jan. 5, 2012", 6 pgs.

"International Application No. PCT/AU2010/000768, International Search Report and Written Opinion mailed Sep. 8, 2010", 9 pgs.

"Japanese Application No. 2012-515292, Notice of Reasons for Rejection dated Feb. 13, 2014 [with English translation]", (Feb. 13, 2014), 10 pgs.

"Australian Application No. 2010262768, Patent Examination Report issued Apr. 22, 2014", 3 pgs.

"Chinese Application No. 201080036975.X, First Office Action mailed Jun. 19, 2013", 4 pgs.

"Singapore Application No. 201109429-9, Examination Report dated Jan. 31, 2013", 7 pgs.

* cited by examiner

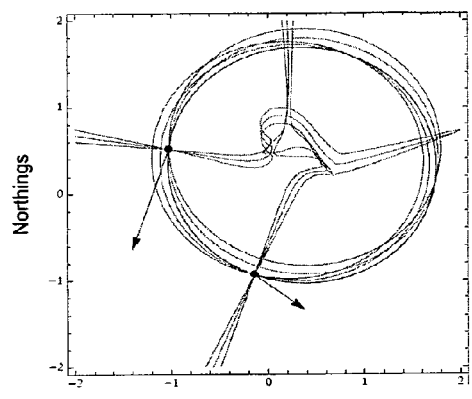
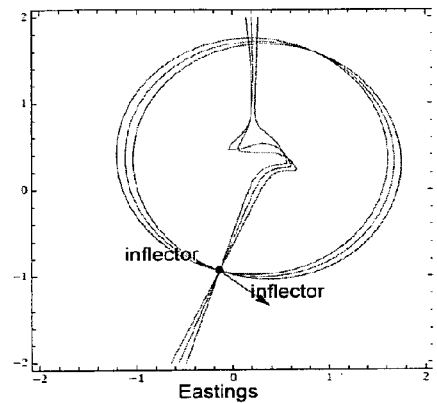
Figure 9A                Figure 9B
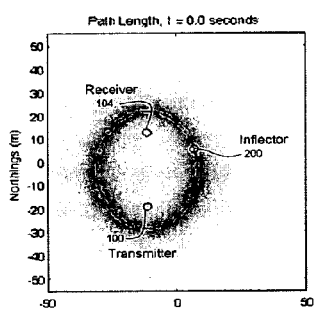
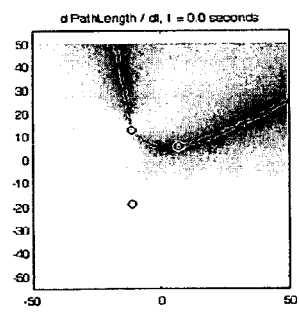
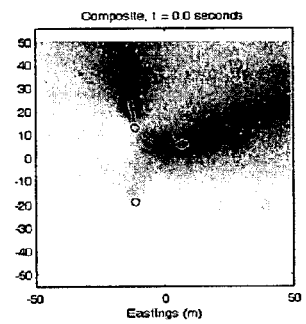
Figure 10A          Figure 10B          Figure 10C

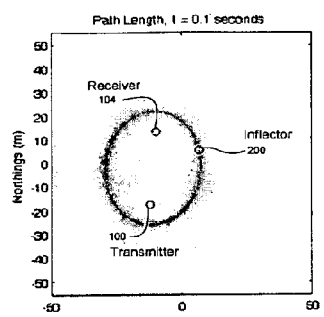 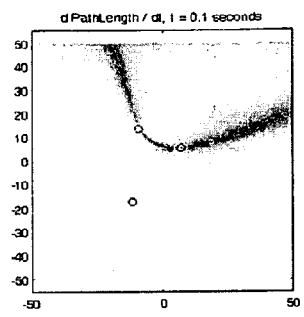 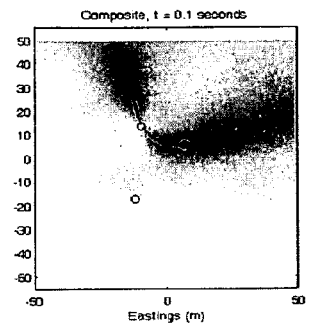
Figure 11A　　　　Figure 11B　　　　Figure 11C
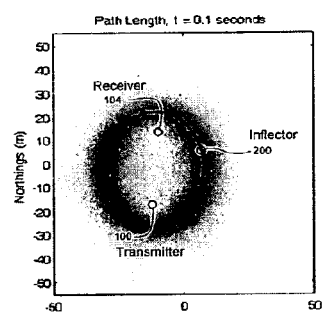 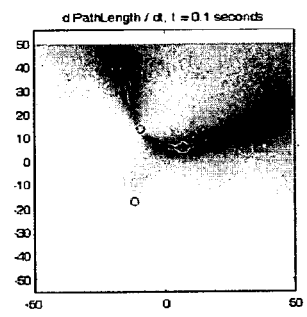 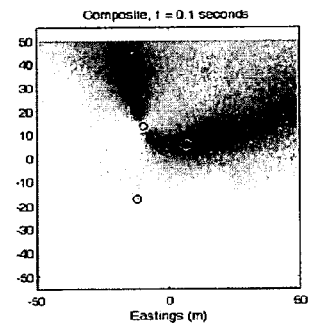
Figure 12A　　　　Figure 12B　　　　Figure 12C

ENVIRONMENT ESTIMATION IN A WIRELESS COMMUNICATION SYSTEM

PRIORITY CLAIM TO RELATED APPLICATIONS

This application is a national stage application under 35 U.S.C. §371 of PCT/AU2010/000768, filed Jun. 18, 2010, and published as WO 2010/144973 A1 on Dec. 23, 2010, which claims priority to Australian Application No. 2009902848, filed Jun. 19, 2009, which applications and publication are incorporated herein by reference and made a part hereof in their entirety, and the benefit of priority of each of which is claimed herein.

FIELD OF THE INVENTION

The present invention relates to the field of wireless communications. In particular the present invention relates to the detection, tracking and characterisation of objects in the environment surrounding a wireless communications system.

BACKGROUND OF THE INVENTION

Wireless communication systems may be represented in terms of a transmitter 100 and receiver 104, separated by a channel 102, as shown in FIG. 1. The transmitter transforms the data into a signal suitable for transmission over the channel. For the purposes of determining the transmitted data, the goal of the receiver 104 is to remove the effects of the channel distortions from the signal and to obtain an estimate of the data.

The channel 102 represents the effects induced by the environment surrounding the wireless communications system. The channel 102 may distort the transmitted signal in some way. Channel distortions may include amplitude distortions, frequency offsets, phase offsets, Doppler effects, distortions resulting from multipath channels, additive noise or interference.

The receiver 104 may include a channel estimator. The channel estimator may observe a received signal that has been distorted by transmission over the channel 102, and generate a channel estimate based upon this observation. The content of the channel estimate is related to the environment that induced the channel.

Spatial parameters pertaining to the transmitter 100 and/or receiver 104 devices may be known. Such parameters may include spatial coordinates, velocity, and acceleration. For example, the devices may be positioned at known fixed locations. Spatial parameters may also be obtained from a Global Positioning System (GPS) receiver or similar device. Furthermore, spatial information relating to the transmitter 100 may be passed to the receiver 104 within the transmitted data content. An example of such a case occurs in Dedicated Short Range Communications (DSRC) systems, where transmitted data may include position, speed, acceleration and heading information, as described in SAE International, "Dedicated Short Range Communications (DSRC) Message Set Dictionary," J2735, December 2006.

Reference to any prior art in the specification is not, and should not be taken as, an acknowledgement or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

The present invention provides methods of detection, tracking and characterisation of objects in the environment surrounding a wireless communications system, by processing information pertaining to elements of the system and information extracted from a waveform received by an element of the wireless communications system.

Transmitters in the communications system may include their state in the messages they transmit. At the receiver the messages may be recovered and form part of the receiver's view of the transmitter state.

According to a first aspect of the invention there is provided a method for estimating an environment surrounding a wireless communication system, the environment including at least one inflector that inflects transmitted signals, the method comprising:

receiving an input signal transmitted from a transmitter to a receiver via a wireless communication channel;

receiving system state information pertaining to at least one of the receiver, the transmitter and the inflector;

estimating at least one property of the inflector based on the received input signal and the system state information.

In another aspect of the invention an environment estimator is disclosed that collects observations over time that contain system state information. The environment estimator uses said observations to estimate aspects of one or more inflectors. Inflectors are elements in the environment that cause reflections or diffractions of radio waves. Said system state information may relate to transmitters, receivers, the environment and inflectors within the environment.

In another aspect of the invention a first inflector constraint is determined for use in estimating the environment where An inflector is located relative to the transmitter by a inflector transmitter unit vector and an inflector transmitter distance A receiver is located relative to an inflector by a receiver inflector unit vector and a receiver inflector distance Constraint: The vector representing the receiver relative to the transmitter is equal to the sum of the vectors representing the inflector relative to the transmitter and the receiver relative to the inflector.

A second inflector constraint may also be determined where

Two versions of a transmitted signal arrive at the receiver with a measurable time difference.

Said time difference is converted to a path length difference (e.g. by multiplying said time difference by the speed of light)

Constraint: the distance from the transmitter to the receiver added to said path length difference must equal the sum of the distance from the inflector to the transmitter and the inflector to the receiver.

A third inflector constraint may also be determined where

Two versions of a transmitted signal arrive at the receiver with a measurable frequency offset.

Said frequency offset is converted to a speed difference (e.g. via multiplication by the speed of light and division by the centre frequency)

Constraint: The component of the transmitter velocity towards the inflector added to the component of the difference of receiver and inflector velocities towards the inflector must equal said speed difference A fourth inflector constraint may also be determined where the inflector is constrained across observations
- A first and second observation occur at different times
- The time difference between said first and second observations is calculated
- A first inflector position difference is the inflector velocity multiplied by said time difference
- A first inflector position is the transmitter position at said first observation time plus the inflector transmitter unit vector at said first observation time multiplied by the inflector transmitter distance at said first observation time
- A second inflector position is the transmitter position at said second observation time plus the inflector transmitter unit vector at said second observation time multiplied by the inflector transmitter distance at said second observation time
- A second inflector position difference is the said second inflector position minus the said first inflector position
- Constraint: The first inflector position difference and the second inflector position difference must be equal In another aspect of the invention one or more constraints are used to derive cost functions. Said cost functions may be combined over observations to produce another cost function.

In another aspect of the invention a hypothesis set is created of unknown inflector properties. Cost of each hypothesis in said hypothesis set may then be calculated using said cost functions.

In another aspect of the invention constraints on the rate of change of position and/or speed are included in the observation processing In another aspect of the invention constraints on inflector location or velocity are induced through knowledge of map data.

Functional uses for outputs of the environment estimator are also described.

A further aspect of the invention provides a system for estimating the environment surrounding a wireless communications system, comprising:
- an input operable to receive a signal transmitted via a communication channel;
- an input operable to receive system state information;
- an environment estimator operable to estimate at least one feature of the environment based on the inputs; and
- an output for providing the environment estimate.

The environment estimator may include an observation generator which outputs at least one observation generated using at least one of said inputs.

The environment estimator may further include an observation processor which processes at least one said observation as input and provides an estimate of the environment as output.

The system state information may include at least one and preferably a combination of:
- position;
- speed;
- acceleration;
- heading;
- velocity;
- elevation;
- time of transmission;
- time of reception;
- transmit power level;
- receive power level;
- signal to noise ratio (SNR);
- location of system components, such as antennas;
- structure of host;
- presence of an obstacle;
- information relating to an obstacle, such as its location;
- temperature and weather conditions,
- rain sensor information;
- sun sensor information;
- vehicle windscreen wiper rate;
- information available from automotive controller-area network (CAN) bus;
- map data;
- statistical confidence estimates for any of the above.

The structure of the host may comprise at least one of:
- size of host;
- type of host;
- shaped of host;
- construction material;

The system state information may be obtained from sources at or nearby at least one of:
- transmitter;
- receiver; and
- environment.

The input system state information may include receiver information may, comprise at least one of:
- received signal samples;
- an estimate of the communication channel between transmitter and receiver.

The estimate of the communication channel may comprise at least one of:
- a time domain channel estimate;
- a frequency domain channel estimate.

The input system state information obtained at or near the transmitter is contained in the transmitted signal and extracted at the receiver for input to the environment estimator.

The input system state information pertaining to the transmitter may be derived at the receiver.

The derived input system state information pertaining to the transmitter may include at least one of:
- speed;
- acceleration;
- heading; and
- velocity.

The observation, denoted $\Omega$, may include at least one of:
- the point T representing the position of the transmitter;
- the point R representing the position of the receiver;
- the instantaneous velocity vector $\vec{v}_T$ for the transmitter;
- the instantaneous velocity vector $\vec{v}_R$ for the receiver;
- a channel estimate h;
- time of the observation $\tau$;
- the received signal;

The observation generator may output an observation for at least one of:
- each received signal corresponding to multiple transmitted signals separated in time;
- each received signal corresponding to multiple transmitted signals overlapped in time;
- each channel induced between a transmitter and a receive antenna, in the case of multiple transmitters;
- each channel induced between a transmit antenna and a receive antenna, in the case of multiple receive antennas;
- each channel induced between a transmit antenna and a receive antenna, in the case of multiple transmit antennas;

The observation generator may group observations containing common components, without replication of said common components.

The observation processor may process at least one property of at least one inflector located in said environment.

The inflector properties may comprise at least one of:
position;
speed;
acceleration;
heading;
velocity; and
elevation.

The output environment estimate may include at least one hypothesis on a property of at least one inflector located in said environment.

The observation processor may apply at least one constraint upon at least one property of at least one said inflector to calculate said output environment estimate.

The frequency offset parameter ω may be calculated from said channel estimate, ĥ, in the time domain, as the rate of change of phase of the tap corresponding to the inflected path relative to that of the tap corresponding to the direct path.

Calculation of said frequency offset parameter ω from said channel estimate is performed via at least one of:
across the duration of said channel estimate;
across some section of said channel estimate; and
at intervals through said channel estimate.

Said constraints may be applied across a plurality of observations under some assumption on the position of one or more system components with respect to time.

A plurality of said constraints may be combined to form a system of equations, and said observation processor may solve said system using at least one input observation, to output said environment estimate.

Said environment estimate output may comprise all feasible inflector property solutions.

Said observation processor may reduce the set of feasible inflector property solutions prior to output, using at least one of:
additional constraints; and
additional input observations;

Additional observations may be provided by at least one of the following:
reception of at least one more transmitted signal from the same transmitter;
reception of at least one more transmitted signal from an alternate transmitter; and
reception of at least one more transmitted signal via at least one more receive antenna.

Said constraints may be used to derive one or more cost functions and evaluate cost for one or more hypotheses on one or more inflector properties, and said observation processor calculates said cost functions using at least one input observation, to output said environment estimate.

A set of points to be used as inflector location hypotheses may be selected by quantizing some region of the environment.

Said region may be selected around at least one of:
transmitter; and
receiver.

The output environment estimate may comprise at least one of:
an inflector property hypothesis with the lowest cost value;
a set of inflector property hypotheses with equally lowest cost value;
a set of inflector property hypotheses with cost value within some predetermined distance from the hypothesis on said inflector property with the lowest cost value;
a set of one or more inflector property hypotheses with associated cost below some predetermined threshold;
a set of one or more inflector properties with cost value assigned to each;

Said observation processor may combine a plurality of said cost functions across at least one input observation.

Said observation processor may combine one or more said cost functions across a plurality of input observations occurring at different times.

Said cost functions may be applied serially while reducing the size of the hypothesis set on one or more inflector properties at intermediate steps.

Said observation processor may calculate the cost of each hypothesis using at least one cost function, then reduce the hypotheses set size by removing at least one member, before applying at least one further cost function.

At least one member of the hypotheses set may be removed having at least one of:
cost greater than some threshold; and
cost greater than some distance from the lowest cost.

The observation processor may constrain the speed of the inflector, said constraint on inflector speed comprising at least one of:
excluding inflector property hypotheses having speed outside of some predefined range;
excluding inflector property hypotheses according to some distribution controlled by speed;
applying a higher cost to speeds outside of some predefined range; and
assigning a cost according to some distribution controlled by speed;

The observation processor may constrain at least one said inflector property by considering the inflector to be at least one of:
a reflector;
heading in a direction where its path is not blocked;
on some constrained path defined by a map; and
on a road.

The observation processor may use at least one additional feature of said estimate of the communication channel induced by the presence of at least one additional inflector, to determine at least one said inflector property for said additional inflector.

The additional channel feature may be a time domain tap in said time domain channel estimate.

Information received by said environment estimator may be used for at least one of:
providing an alert when detecting a potential collision threat;
modifying the nature of an alert;
modifying the trigger of an alert;
reducing the likelihood of false alerts;
improving positioning accuracy.

Knowledge of at least one reliable source of position information, combined with the relative location of said reliable source to an unreliable source of position information, may be used to perform at least one of:
detecting the unreliable source;
tracking the unreliable source; and
correcting the unreliable source.

Said environment estimator output may be used for altering map information via at least one of:
detecting erroneous map information;
correcting erroneous map information; and
augmenting existing map information.

BRIEF DESCRIPTION OF THE DRAWINGS

Embodiments of the present invention will now be described with reference to the drawings, in which:

FIGS. 9A and 9B: illustrate an example solution for inflector position and velocity obtained by solving a system of equations derived from constraints;

FIGS. 10 A, B, C: illustrate an example solution for inflector position obtained by applying cost functions derived from constraints, to a first observation;

FIGS. 11A, B and C: illustrate an example solution for inflector position obtained by applying cost functions derived from constraints, to a second observation;

FIGS. 12 A, B and C: illustrate an example solution from combining solutions for inflector position obtained by applying cost functions derived from constraints, across both a first and a second observation.

DETAILED DESCRIPTION OF THE EMBODIMENTS

Embodiments of an environment estimator are described that allows detection, tracking and characterisation of objects in the environment surrounding a wireless communications system, by processing information pertaining to system elements and information extracted from a received waveform.

The described techniques have potential application to wireless communications systems, e.g. DVB-T, DVB-H, IEEE 802.11, IEEE 802.16, 3GPP2, Dedicated Short Range Communications (DSRC), Communications Access for Land Mobiles (CALM), and proprietary systems.

Objects in the environment may be either stationary or mobile. They may also be fitted with wireless communications equipment. For example, in a Dedicated Short Range Communications (DSRC) system, the transmitter (Tx) 100 and receiver (Rx) 104 may be included in an infrastructure Road Side Unit (RSU), or On Board Unit (OBU) in a vehicle. The transmitted signal may be inflected by objects in the environment, e.g. through reflection or diffraction. Example inflectors include vehicles, signs, buildings or other structures within the environment, which may be equipped with transmitters and/or receivers themselves.

Figure 1:
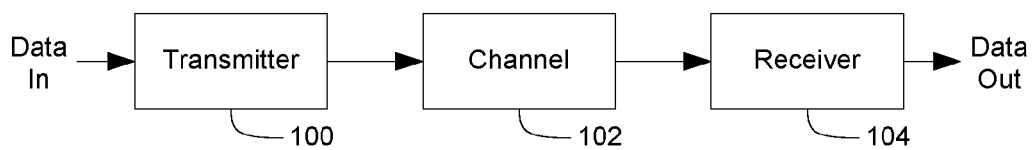
FIG. 1: is a schematic drawing of a communications system.
Figure 2:
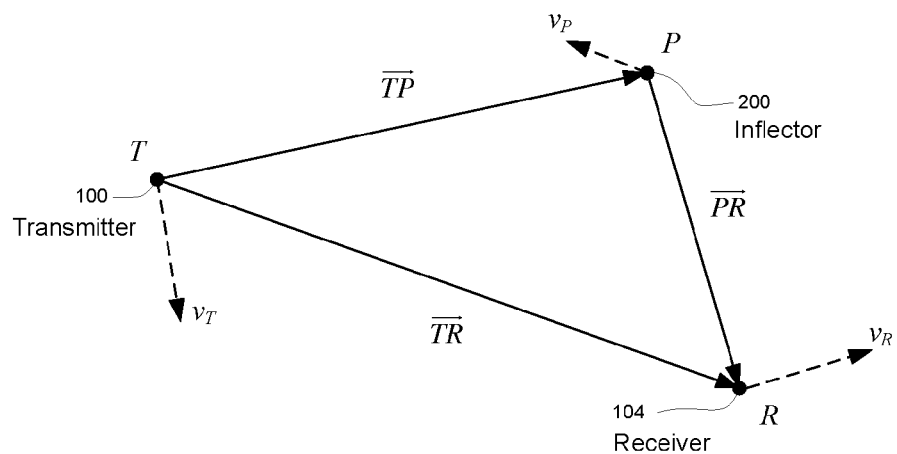
FIG. 2: is an example environment with a two-path channel.

FIG. 2 shows an example environment with an inflector 200 inducing a two path channel between the transmitter 100 and receiver 104, where:

T is a point representing the position of the transmitter 100;
R is a point representing the position of the receiver 104;
P is a point representing the position of the signal inflector 200;

$\vec{v}_T$ is the instantaneous velocity vector for the transmitter 100;

$\vec{v}_R$ is the instantaneous velocity vector for the receiver 104;

$\vec{v}_P$ is the instantaneous velocity vector for the signal inflector 200;

$\vec{TR}$ is the vector from point T to R;

$\vec{TP}$ is the vector from point T to P; and $\vec{PR}$ is the vector from point P to R.

It is also convenient to define the following, where $\|.\|_2$ denotes the L2 Norm:

$$\vec{u}_{TP} = \frac{(P-T)}{\|P-T\|_2}$$

is the unit vector in the direction of $\vec{TP}$;

$$\vec{u}_{PR} = \frac{(R-P)}{\|R-P\|_2}$$

is the unit vector in the direction of $\vec{PR}$;

$L_{TP} = \|\vec{TP}\|_2$ is the distance between points T and P;

$L_{PR} = \|\vec{PR}\|_2$ is the distance between points P and R; and $L_{TR} = \|\vec{TR}\|_2$ is the distance between points T and R.

Figure 3:
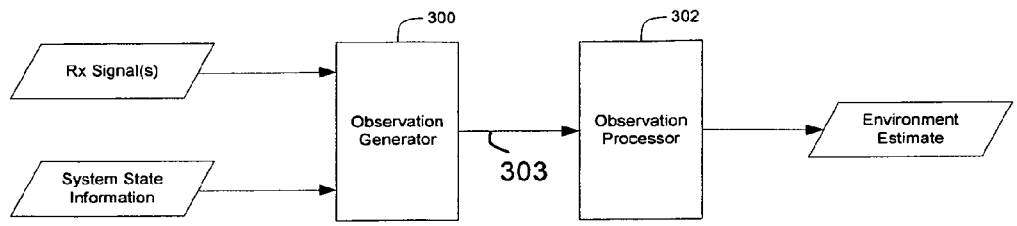
FIG. 3: is a schematic drawing of an environment estimator.

FIG. 3 shows a block diagram for an environment estimator. The environment estimator may operate at a receiver 104. Alternatively, functional components of the environment estimator may operate in a distributed fashion. In some arrangements the environment estimator may operate off-line, using information that was previously captured.

The functional modules described herein (including the observation generator 300, observation processor 302, Tx Data Constructor 400, SSI Extractor 504 and Observation Constructor 506) may be implemented in hardware, for example application-specific integrated circuits (ASICs). Other hardware implementations include, but are not limited to, field-programmable gate arrays (FPGAs), structured ASICs, digital signal processors and discrete logic. Alternatively, the functional modules may be implemented as software, such as one or more application programs executable within a computer system. The software may be stored in a computer-readable medium and be loaded into a computer system from the computer readable medium for execution by the computer system. A computer readable medium having a computer program recorded on it is a computer program product. Examples of such media include, but are not limited to CD-ROMs, hard disk drives, a ROM or integrated circuit. Program code may also be transmitted via computer-readable transmission media, for example a radio transmission channel or a networked connection to another computer or networked device.

One or more received signals are input to an observation generator 300. System state information (SSI) may also be input to the observation generator. The observation generator 300 outputs one or more observations 303 to the observation processor 302. Observations 303 may include information from the receiver 104 and system state information. The observation processor 302 then processes the observations 303 and outputs an estimate of the environment. For example, the environment estimate may include position estimates for one or more inflectors in the environment.

System state information (SSI) may pertain to the transmitter 100, receiver 104 and/or the environment, including:
Position;
Speed;
Acceleration;
Heading;
Elevation;
Time of transmission or reception;
Transmit power level;
Receive power level;
Signal to Noise Ratio (SNR);
Location of system components, such as antennas;
Structure of the host:
   Size, type, of host. For example, if the transmitter 100 or receiver 104 are mounted in a vehicular host, this information may include:
      Type of vehicle;
      Size of vehicle;
   Material with which host is constructed.
Other information known to about the environment. For example:
   The presence of an obstacle and information relating to the obstacle, such as the location of the obstacle, obtained for example from an automotive radar system;
   Temperature and weather conditions, and/or information allowing such conditions to be estimated, e.g. vehicle windscreen wiper rate;
   rain sensor information;
   sun sensor information;
   Map data, e.g. indicating location of structures and roads;
   Information available from automotive controller-area network (CAN) bus;
   Statistical confidence estimates for any of the above.

Figure 4:
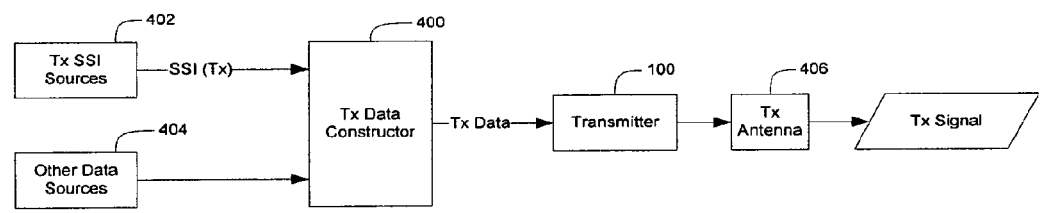
FIG. 4: illustrates processing occurring at a transmitter in a communications system and including the use of system state information (SSI)

FIG. 4 schematically shows processing occurring at the transmitter 100. Data may be collected from one or more sources of system state information (SSI) 402. SSI sources 402 may be located at or near the transmitter 100, e.g. a GPS unit located with the transmitter in a vehicle. Another example of an SSI source 402 is a vehicular CAN bus, which may provide access to vehicle state information such as vehicle speed and brake status. SSI sources 402 may also be located elsewhere in the environment, making the SSI available at the transmitter, e.g. via a wireless communications link. SSI may be combined with data from other sources 404 at the transmit data constructor 400, which then outputs the Tx data to the transmitter 100. The transmitter produces the transmit signal which is then transmitted via one or more transmit antennas 406. A data storage facility may be provided to store the SSI either transiently or for longer periods.

The transmitter 100 and receiver 104 may be collocated, thus avoiding the need to include system state information pertaining to the transmitter 100 in the transmitted signal. For example, the transmitter 100 and receiver 104 may both be located on the same vehicle.

Figure 5:
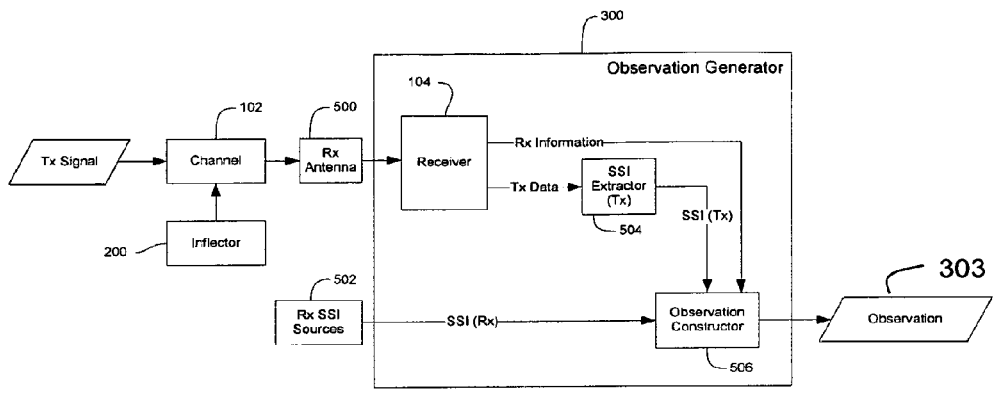
FIG. 5: illustrates the transmitted signal being subjected to the channel and provides a schematic drawing of an observation generator in the case of one receive antenna.

The transmit signal is subjected to the channel 102 induced by the environment, including the presence of the inflector 200, as shown in FIG. 5. The received signal is collected at the receive antenna 500, and input to the receiver 104. The receiver 104 processes the received signal to determine the transmitted data. The receiver 104 also performs processing as part of the observation generator 300. FIG. 5 shows receiver processing in the context of the observation generator 300 and may omit details pertaining to the common operation of a receiver 104 apparent to those skilled in the art. For example, the receiver 104 may also make the transmitted data available to other components of the system. The receiver 104 outputs receiver information, e.g. received signal samples and/or a channel estimate. The channel estimate may be provided in the time and/or frequency domain, including one or more channel estimate samples over some duration. Our previous commonly-assigned International (PCT) Applications, PCT/2006/AU001201, PCT/2007/AU000231 and PCT/2007/AU001506 published under WIPO publication numbers WO2007022564 WO2007095697, WO2008040088 (respectively), the contents of which are incorporated herein by reference, disclose systems and methods for providing the required channel estimates in receiver 104.

The observation generator 300 obtains system state information sent by the transmitter using the SSI extractor 504. Data may also be collected from one or more sources of system state information (SSI) 502. SSI sources 502 may be located at or near the receiver 104, e.g. a GPS unit collocated with the receiver in a vehicle. SSI sources 502 may also be located elsewhere in the environment, making the SSI available at the receiver, e.g. via a wireless communications link.

System state information pertaining to the transmitter 100 may also be derived at the receiver 104. For example, a process at the receiver 104 (for example in the SSI extractor 504) may track the received positions of the transmitter 100 over time and use this to derive speed, acceleration and heading of the transmitter 100.

The observation constructor 506 is provided with receiver information from the receiver 104, for example received signal samples and/or a channel estimate. The observation constructor also receives SSI pertaining to the transmitter, for example from SSI extractor 504 and also SSI pertaining to the receiver, for example from the SSI sources 502. The observation constructor 506 forms an observation 303 from the available receiver information and system state information. The observation is denoted $\Omega[i]$, where i is the observation index, and may include:
   T[i] the point $(x_T[i], y_T[i], z_T[i])$ representing the position of the transmitter 100;
   R[i] the point $(x_R[i], y_R[i], z_R[i])$ representing the position of the receiver 104;
   $\vec{v}_T[i]$ the instantaneous velocity vector for the transmitter 100;
   $\vec{v}_R[i]$ the instantaneous velocity vector for the receiver 104;
   $\hat{h}[i]$ a channel estimate;
   $\tau[i]$ Time of the observation;
   the received signal;
   other system state information, as described above.

The observation index in square brackets is henceforth used to denote values taken directly from $\Omega[i]$ or derived from information in $\Omega[i]$.

When the transmitter 100 transmits multiple signals separated in time, e.g. multiple packets, the observation generator 300 may output an observation for each corresponding received signal. If there are N transmitted signals separated in time and the receiver 104 has M receive antennas then up to N×M observations are output.

In the case of multiple transmitters, the observation generator 300 may output an observation for each channel induced between a transmitter and a receive antenna. If there are N transmitted signals and the receiver 104 has M receive antennas then up to N×M observations are output. In the case when N transmitted signals are overlapped in time in the received signal, transmitted data and receiver information may be determined using techniques described in our commonly-assigned International (PCT) Applications, PCT/2003/AU00502 and PCT/2004/AU01036, published under WIPO publication numbers WO2005011128 and WO03094037 which are incorporated herein by reference. In this case, if the receiver 104 has M antennas then up to N×M observations are output.

In the case of spatial diversity systems using multiple transmit antennas, operation of the observation generator 300 may be considered equivalent to the case of multiple transmitters, as will be apparent to those skilled in the art.

Figure 6:
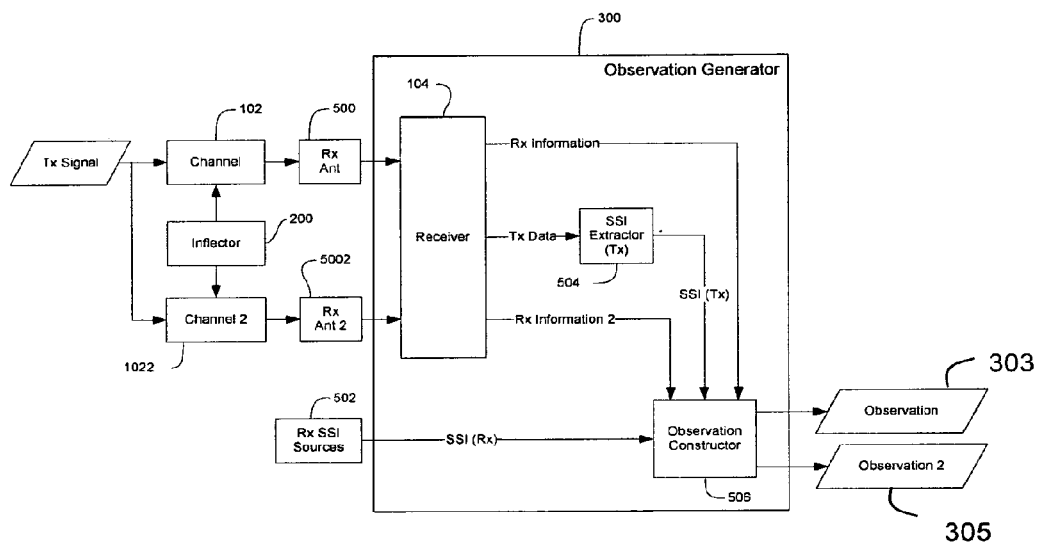
FIG. 6: illustrates the transmitted signal being subjected to the channel and provides a schematic drawing of an observation generator in the case of two receive antennas.

FIG. 6 shows a schematic illustration of an observation generator 300 when the receiver uses two receive antennas 500, 5002. A first observation 303 is formed as described above. A second channel 1022 is induced by the surrounding environment, including the presence of the inflector 200, as the transmit signal travels from transmitter 100 to a second receive antenna 5002. System state information is obtained as described for the single antenna case. The receiver 104 outputs a second set of receiver information corresponding to the signal input from the second receive antenna 5002. The observation constructor 506 uses system state information and the second set of receiver information to form a second observation 305. This approach can also be used to support receivers that use more than two receive antennas.

In the case where precise information on the location of transmit and/or receive antenna(s) is available in the SSI, this information may be used during calculation of path lengths.

Each observation is passed to the observation processor 302. Observations may be grouped to avoid duplication of common components. An example where such grouping may be used is if multiple antennas provide multiple channel estimates for the same received packet with common SSI pertaining to the transmitter. The observation processor 302 may receive observations generated by system components that are collocated with and/or part of the receiver 104. The observation processor 302 may also receive observations from system components elsewhere in the environment, e.g. at another physically separated receiver, and transferred to the observation processor e.g. using wireless communications.

The received signal in the environment of FIG. 2 is a combination of:
The transmitted waveform from the direct path from the transmitter 100; and
The signal that propagates from transmitter 100 to inflector 200, then from inflector 200 to receiver 104.

A first constraint on the location of the signal inflector 200 is therefore:

$$P = T + L_{TP}\vec{u}_{TP} = R - L_{PR}\vec{u}_{PR} \quad \text{(Eq. 1)}$$

Figure 7:
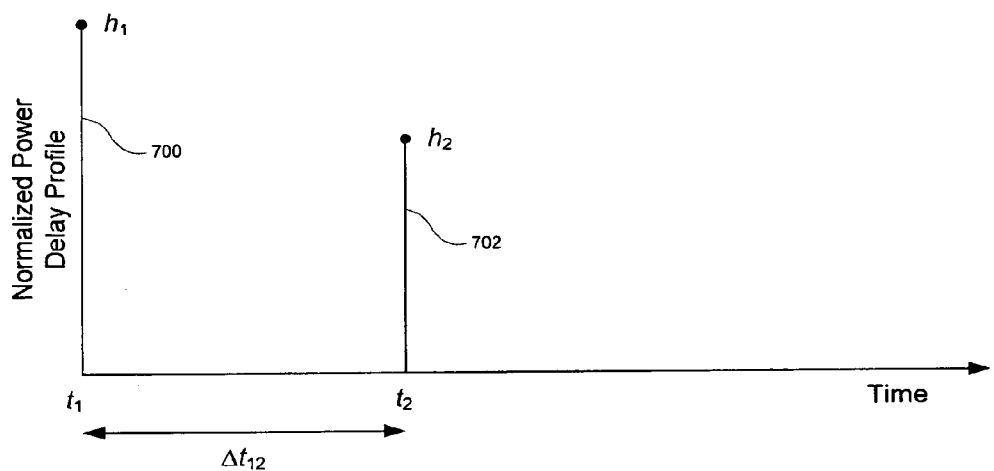
FIG. 7: is an example time domain channel corresponding to the environment of FIG. 2.

FIG. 7 shows an example channel in the time domain (with normalised power delay profile) corresponding to the environment of FIG. 2. The direct path corresponds to channel tap $h_1$ 700 at time $t_1$. The inflected path corresponds to channel tap $h_2$ 702 at delay $t_2$. In this example $h_2$ 702 has lower power relative to tap $h_1$ 700 due to increased propagation loss (as the inflected path is longer than the direct path) and attenuation at the point of inflection 200. The time difference between the two channel taps is $\Delta t_{12} = t_2$. The instantaneous phase, and rate of change of phase, of taps $h_1$ 700 and $h_2$ 702 may also differ.

Assuming propagation at the speed of light, c, $\Delta t_{12}$ relates to the path length difference between the direct and inflected paths, providing a second constraint:

$$L_{TP} + L_{PR} - L_{TR} = \Delta t_{12} c \quad \text{(Eq. 2)}$$

Given locations of the transmitter 100 T, and receiver 104 R, the length of the direct path $L_{TR}$ is determined geometrically. An estimate, $\hat{\Delta t}_{12}$, of delay difference $\Delta t_{12}$ is obtained from the channel estimate $\hat{h}$. For example, $\hat{\Delta t}_{12}$ may be measured from a time domain estimate of the channel.

Figure 8:
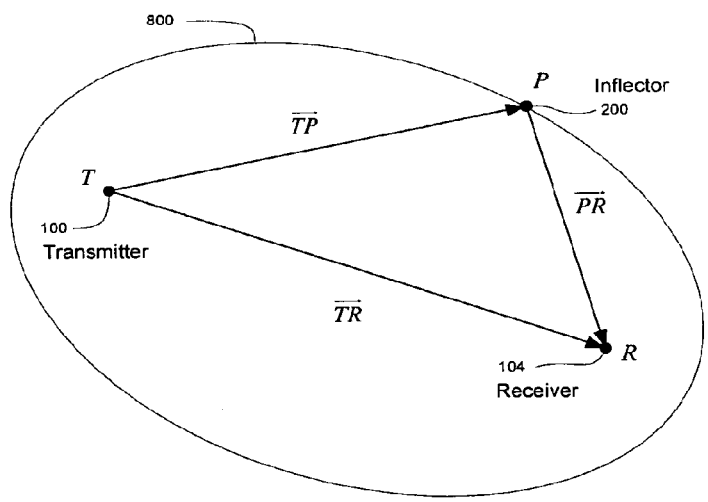
FIG. 8: illustrates a loci of feasible solutions for inflector position by combining first and second constraints.

Combining the first and second constraints enables the observation processor 302 to infer that the signal inflector 200 is placed on the loci of the ellipse 800, shown in FIG. 8, having foci at the transmitter, 100 T, and receiver 104, R. Point P is the actual location of the inflector in the example.

The frequency offset of the inflected path, $\omega$, may be determined from the channel estimate $\hat{h}$, as the rate of change of phase of time domain tap $\hat{h}_2$ 702 relative to that of tap $\hat{h}_1$ 700. The frequency offset may be calculated across the duration of a channel estimate or some section thereof and/or at intervals.

The frequency offset, $\omega$, is due to relative Doppler, providing a third constraint:

$$\vec{v}_T \cdot \vec{u}_{TP} + (\vec{v}_P - \vec{v}_R) \cdot \vec{u}_{PR} = -c \frac{\omega}{\omega_0}, \quad \text{(Eq. 3)}$$

Where:
c is the speed of light;
$\omega_0$ is the centre frequency of the transmitted signal;
• denotes vector dot product.

Further constraints may be derived from Eqs. 1-3 by differentiating with respect to time, making use of velocity and/or acceleration from system state information where applicable.

In one arrangement, assuming the inflector is stationary, i.e. $\|v_P\|=0$, the observation processor 302 determines one or more feasible inflector locations, P, by solving the constraints in the following system of equations:

$$T + L_{TP}\vec{u}_{TP} = R - L_{PR}\vec{u}_{PR}$$

$$L_{TP} + L_{PR} - L_{TR} = \Delta t_{12} c$$

$$\vec{v}_T \cdot \vec{u}_{TP} + \vec{v}_R \cdot \vec{u}_{PR} = -c \frac{\omega}{\omega_0}$$

$$\|\vec{u}_{TP}\|_2 = 1$$

$$\|\vec{u}_{PR}\|_2 = 1$$

By representing $P=T+L_{TP}\vec{u}_{TP}=R-L_{PR}\vec{u}_{PR}$ the above system is quadratic (in $\vec{u}_{TP}$ and $\vec{u}_{PR}$). The solution may be obtained using techniques apparent to those skilled in the art, for example the Newton-Raphson method. Note that it is only required to solve either for $L_{TP}$ and $\vec{u}_{TP}$, or $L_{PR}$ and $\vec{u}_{PR}$, i.e. one of these pairs can be eliminated if desired, e.g. to reduce computational complexity.

The system yields four solutions, two imaginary and two real. Each of the real solutions corresponds to feasible choices of P, consistent with the input observation.

The observation processor may apply techniques to reduce this ambiguity, e.g. by including additional observations, as described below.

In another arrangement the observation processor 302 determines one or more feasible inflector locations, P, and feasible velocities, $v_P$, by using two or more observations. Assume input observations $\Omega[i]$ at time $\tau[i]$ and $\Omega[k]$ at time $\tau[k] > \tau[i]$. An assumption may be made upon the inflector location with respect to time. For example, when $\tau[k]-\tau[i]$ is considered sufficiently small to ignore acceleration of the inflector:

$$\vec{v}_P[i] = \vec{v}_P[k]$$

Hence the observation index is omitted from the inflector velocity, and the following system of equations may be solved by the observation processor to determine P and $v_P$:

$$T[i] + L_{TP}[i]\vec{u}_{TP}[i] = R[i] - L_{PR}[i]\vec{u}_{PR}[i]$$

$$T[k] + L_{TP}[k]\vec{u}_{TP}[k] = R[k] - L_{PR}[k]\vec{u}_{PR}[k]$$

$$L_{TP}[i] + L_{PR}[i] - L_{TR}[i] = \Delta t_{12}[i]c$$

$$L_{TP}[k] + L_{PR}[k] - L_{TR}[k] = \Delta t_{12}[k]c$$

$$\vec{v}_T[i] \cdot \vec{u}_{TP}[i] + (\vec{v}_P - \vec{v}_R[i]) \cdot \vec{u}_{PR}[i] = -c\frac{\omega[i]}{\omega_0}$$

$$\vec{v}_T[k] \cdot \vec{u}_{TP}[k] + (\vec{v}_P - \vec{v}_R[k]) \cdot \vec{u}_{PR}[k] = -c\frac{\omega[k]}{\omega_0}$$

$$\|\vec{u}_{TP}[i]\|_2 = 1$$

$$\|\vec{u}_{TP}[k]\|_2 = 1$$

$$\|\vec{u}_{PR}[i]\|_2 = 1$$

$$\|\vec{u}_{PR}[k]\|_2 = 1$$

$$T[i] + L_{TP}[i]\vec{u}_{TP}[i] + \vec{v}_P(\tau[k] - \tau[i]) = T[k] + L_{TP}[k]\vec{u}_{TP}[k]$$

The observation processor 302 may determine velocities of the transmitter 100 and receiver 104 from the input observations. Alternatively it may also ignore acceleration on either or both, thus setting:

$$\vec{v}_T[i] = \vec{v}_T[k] \text{ and/or}$$

$$\vec{v}_R[i] = \vec{v}_R[k]$$

in the above system.

Once again this is a system of linear and quadratic equations (in $L_{TP}$, $L_{PR}$, $\vec{u}_{TP}$, $\vec{u}_{PR}$ and $\vec{v}_P$) and the solution may be obtained using techniques apparent to those skilled in the art. The first ten constraints in the system are simply duplications of those for the case when $\|v_P\|=0$. The final constraint enforces $$P[k] = P[i] + \vec{v}_P(\tau[k] - \tau[i]). \quad (Eq. 4)$$

As for the case when $\|v_P\|=0$, the only quadratic constraints involve $\vec{u}_{TP}$ and $\vec{u}_{PR}$.

Solutions to the systems described above may result in multiple feasible choices of P and $\vec{v}_P$. In such cases, the observation processor 302 may:

Output all feasible choices of P;
Increase the total number of constraints to resolve the ambiguity, using additional observations, for example:
In time, e.g. reception of another packet;
In space, e.g. another antenna; and/or
In space and time, e.g. reception of another packet from a different transmitter.
Create a hypothesis on inflector location $\hat{P}[k] = P[i] + \vec{v}_P(\tau[k]-\tau[i])$ at time $\tau[k]$, and test whether this hypothesis satisfies one or more of the constraints using an observation taken at time $\tau[k]$, e.g. $L_{T\hat{P}}[k] + L_{\hat{P}R}[k] - L_{TR}[k] = \Delta t_{12}[k]c$.

In one arrangement the observation processor 302 solves a system of equations derived from the constraints as described above. FIGS. 9A and 9B show solutions for an example system having a single transmitter 100, receiver 104, and inflector 200. Feasible inflector locations are represented by points, and velocities by arrows. The observation processor 302 determines two feasible solutions for inflector location and velocity. The solutions are shown in FIG. 9A. Using a further observation to reduce ambiguity as described above, the observation processor 302 then arrives at the correct solution, shown in FIG. 9B.

This example is given for two-dimensional space. However, the environment may be considered in some other number of dimensions, and techniques described herein applicable to such spaces will also be apparent to those skilled in the art.

In another arrangement the observation processor 302 uses constraints to construct one or more cost functions, and evaluates a cost for one or more hypotheses on properties of the inflector, such as:
position;
speed;
acceleration;
heading;
velocity; and
elevation.

The observation processor 302 may evaluate a cost for one or more hypotheses, $\tilde{P}$, on the inflector location, P, and/or one or more hypotheses, $\vec{v}_{\tilde{P}}$, on its instantaneous velocity, $v_P$. A set of points to be used as location hypotheses is chosen by quantizing some region around the transmitter 100 and/or receiver 104. Similarly, when a cost function is dependent on $\vec{v}_{\tilde{P}}$, a set of instantaneous velocities is chosen as hypotheses for the inflector.

The observation processor evaluates a combination of one or more cost functions for the input set of observations and hypotheses, and then outputs an estimate of the inflector state. The output may be one or more of:

The location hypothesis with the lowest cost value (more than one location may be output if several are equally or similarly likely);
The velocity hypothesis with the lowest cost value (more than one velocity may be output if several are equally or similarly likely);
A set of location hypotheses with cost value within some predetermined distance from the location hypothesis with the lowest cost value;
A set of velocity hypotheses with cost value within some predetermined distance from the velocity hypothesis with the lowest cost value;
A set of one or more location hypotheses with associated cost below some threshold;
A set of one or more velocity hypotheses with associated cost below some threshold;
A set of location hypotheses with cost value assigned to each;
A set of velocity hypotheses with cost value assigned to each;

Using the first and second constraints of Eqs 1 and 2 a cost function for use by the observation processor is:

$$C(\Omega, \tilde{P}) = abs(\|\tilde{P} - T\|_2 + \|R - \tilde{P}\|_2 - L_{TR} - \Delta t_{12}c)$$

where abs(.) denotes the absolute value.

Using the third constraint of Eq. 3 another cost function for use by the observation processor is:

$$C(\Omega, \tilde{P}, \vec{v}_{\tilde{P}}) = \text{abs}\left(\frac{\vec{v}_T \cdot (\tilde{P} - T)}{\|\tilde{P} - T\|_2} + \frac{(\vec{v}_{\tilde{P}} - \vec{v}_R) \cdot (R - \tilde{P})}{\|R - \tilde{P}\|_2} + c\frac{\omega}{\omega_0}\right)$$

The abs( ) function may be substituted by, or combined with, some other function, examples of which include:
  power;
  multiplication by a scaling factor; and
  log.

The location of the inflector 200 and its instantaneous velocity may be considered constant across observations taken at the same time, or within some limited time window. Cost functions may be combined across these observations, dividing the observations into n (potentially overlapping) sets $\Omega_1, \Omega_2, \ldots, \Omega_n$, as follows:

$$C_T = \sum_{i \in \Omega_1} a_{i1} C_1(\Omega[i], \Phi) + \qquad \text{(Eq. 5)}$$

$$\sum_{i \in \Omega_2} a_{i2} C_2(\Omega[i], \Phi) + \ldots + \sum_{i \in \Omega_n} a_{in} C_n(\Omega[i], \Phi),$$

where the following labels apply:
  $C_T$ total combined cost
  i observation index;
  n number of cost functions being applied, and number of observation sets;
  $a_{ij}$ a weight applied to cost function j for observation i; and
  $\Phi$ hypotheses on one or more inflector properties, assumed constant across all observations in the input set.
  For example $\Phi$ may include one or more of:
  $\tilde{P}$ hypothesis on the position of the inflector; and
  $\vec{v}_{\tilde{P}}$ hypothesis on the velocity of the inflector.

For example applying a single cost function across all observations gives n=1 and $\Omega_1$ containing all observations.

Cost functions may also be combined across observations occurring at different times by considering the inflector velocity $\vec{v}_{\tilde{P}}$ to be constant. Given observations $\Omega[i]$ and $\Omega[k]$ at time $\tau[i]$ and $\tau[k]$, we may substitute $\tilde{P}[i] = \tilde{P}[k] - \vec{v}_{\tilde{P}}(\tau[k] - \tau[i])$. For example, cost functions may be combined over two observations to form C, and then the substitution applied to form C' as follows:

$$C(\Omega[i], \Omega[k], \tilde{P}[i], \tilde{P}[k]) = \qquad \text{(Eq. 6)}$$
$$\text{abs}(\|\tilde{P}[i] - T[i]\|_2 + \|R[i] - \tilde{P}[i]\|_2 - L_{TR}[i] - \Delta t_{12}[i]c) +$$
$$\text{abs}(\|\tilde{P}[k] - T[k]\|_2 + \|R[k] - \tilde{P}[k]\|_2 - L_{TR}[k] - \Delta t_{12}[k]c)$$

letting $\tilde{P}[i] = \tilde{P}[k] - \vec{v}_{\tilde{P}}(\tau[k] - \tau[i])$:

$$C'(\Omega[i], \Omega[k], \tilde{P}[k]) = \text{abs}(\|\tilde{P}[k] - \vec{v}_{\tilde{P}}(\tau[k] - \tau[i]) - T[i]\|_2 +$$
$$\|R[i] - \tilde{P}[k] + \vec{v}_{\tilde{P}}(\tau[k] - \tau[i])\|_2 - L_{TR}[i] - \Delta t_{12}[i]c) +$$
$$\text{abs}(\|\tilde{P}[k] - T[k]\|_2 + \|R[k] - \tilde{P}[k]\|_2 - L_{TR}[k] - \Delta t_{12}[k]c)$$

Cost functions may be applied serially while reducing the size of the hypothesis set on one or more inflector properties (e.g. location and/or velocity) at intermediate steps if desired, e.g. to reduce computational complexity. For example the observation processor may calculate the cost of each hypothesis using one or more cost functions, then remove hypotheses from the set that have cost greater than some threshold, or have cost greater than some distance from the lowest cost, before applying one or more further cost functions to the reduced set.

In one arrangement the observation processor 302 assumes a stationary inflector 200, and applies a cost function derived from the first and second constraints as described above, to determine the cost of points around the transmitter 100 and receiver 104. An example result is shown in FIG. 10A. Dark regions in the plot indicate low cost, and light regions indicate high cost. As expected, the most likely (darkest) region determined by the observation processor using this cost function is elliptical. The circle marked 200 indicates the actual location of the inflector.

In this arrangement the observation processor 302 also applies the following cost function, based upon the derivative of the second constraint described above in Eq. 2:

$$C(\Omega, \tilde{P}) = \text{abs}\left(\frac{d}{dt}\|\tilde{P} - T\|_2 + \frac{d}{dt}\|R - \tilde{P}\|_2 - \frac{d}{dt}L_{TR} - \frac{d}{dt}\Delta t_{12}c\right)$$

FIG. 10B shows the cost across the region according to this function. The observation processor 302 then combines results from the two cost functions, e.g. via a linear combination such as in Eq. 4. The resultant combined cost is shown in FIG. 10C.

FIG. 11 shows another example result set for the same embodiment of the observation processor 302 as FIG. 10. In this case the result is generated using a second observation based on a signal received 100 ms after the first observation was taken. Movement of the transmitter 100 and receiver 104 cause the plot to differ from that of FIG. 10. In all plots the set of most likely locations predicted for the inflector includes the actual location of the inflector 200.

FIG. 12 shows the result after the observation processor 302 has combined the results shown in FIG. 10 and FIG. 11, e.g. via a linear combination. The leftmost plot FIG. 12A shows the combined result from the cost function derived from the first and second constraints, ie a combination of the costs illustrated in FIGS. 10A and 11A. The middle plot FIG. 12B shows the combined result from the cost function based upon the derivative of the second constraint, ie a combination of the costs illustrated in FIGS. 10B and 11B. The rightmost plot, FIG. 12C, shows the combination of both cost functions across both observations, ie a combination of the costs illustrated in FIGS. 10C and 11C. By combining further observations, e.g. from more received signals and/or another receive antenna, the location of the inflector 200 may be further refined.

The observation processor 302 may also apply further constraints. Inflector property hypotheses may be excluded from the hypothesis set, or costs on inflector property hypotheses may be calculated after applying one or more constraints on the speed of the inflector 200. For example, the inflector speed may be limited by applying a higher cost to speeds outside of some predefined range, or by assigning a cost according to some distribution controlled by speed.

It may be appropriate to constrain the direction of travel of the inflector 200. For example; it may be appropriate to consider the inflector 200 as a reflector, and constrain its direction of travel to be tangential, or orthogonal, to the ellipse 800 constructed using the constraints, shown in FIG. 8.

It may be appropriate to constrain the location and mobility of the inflector 200. For example, the inflector 200 may be considered to be heading in a direction where its path is not blocked. Map data may be used to constrain inflector location and mobility such that travel is constrained to be on a road with boundaries defined by the map.

The above techniques may also be applied in the case when the environment includes multiple inflectors. Each additional inflector will induce a new feature in the channel, e.g. a new tap in the time domain channel, and hence new set of constraints that enable inflector properties such as position and velocity of the additional inflector to be determined.

Using the above methods to estimate the environment surrounding a wireless communications system allows information about the environment to be processed and provided to recipients, e.g. the driver and/or occupants of a vehicle, and/or used as input to another connected system, such as:
- a vehicle system;
- a road side system;
- a safety system;

For example, the information may be used to:
- provide an alert when detecting a potential collision threat;
- modify alerts, e.g. by changing the nature of the alert or the alert trigger;
- reduce the likelihood of false alerts.

Estimation of the environment surrounding a wireless communications system via the methods described above may also be used to improve positioning accuracy. For example, knowledge of one or more reliable sources of position information, combined with their relative location (as determined via detection, tracking and/or characterisation) to an unreliable source of position information, may be used to detect, track and correct the unreliable source.

Information obtained by estimating the environment surrounding a wireless communications system may also be used to detect and/or correct erroneous map information, or to augment existing map information. These map alterations may also be provided to a central body responsible for reviewing the map data and distributing updates.

The environment estimator may be run online as inputs become available, or in offline mode, post processing input data that was collected prior to its execution.

It will be understood that the invention disclosed and defined in this specification extends to all alternative combinations of two or more of the individual features mentioned or evident from the text or the drawings. All these different combinations constitute various alternative aspects of the invention.

It will also be understood that the term "comprises" and its grammatical variants as used in this specification is equivalent to the term "includes" and should not be taken as excluding the presence of other elements or features.

The invention claimed is:

1. A method for estimating an environment surrounding a wireless communication system, the environment including at least one inflector that inflects transmitted signals, the method comprising:
   receiving an input signal transmitted from a transmitter to a receiver via a wireless communication channel;
   receiving system state information pertaining to at least one of the receiver, the transmitter and the at least one inflector; and
   estimating at least one property of said at least one inflector based on the received input signal and the system state information, the at least one property at least partially inducing the wireless communication channel,
   wherein at least one of the transmitter and the receiver is mobile.

2. The method as claimed in claim 1 wherein said estimating estimates said at least one property selected from the group of:
   a position of the at least one inflector;
   a velocity of the at least one inflector;
   an acceleration of the at least one inflector;
   a heading of the at least one inflector;
   a speed of the at least one inflector; and
   an elevation of the at least one inflector.

3. The method as claimed in claim 1 further comprising:
   issuing an alert dependent on the at least one estimated property of the at least one inflector.

4. The method as claimed in claim 3 wherein the alert is indicative of a potential collision.

5. The method as claimed in claim 1 further comprising:
   comparing the at least one estimated property of the at least one inflector with mapped information descriptive of the environment; and
   generating an indication of erroneous mapped information if said comparing indicates a discrepancy.

6. The method as claimed in claim 1, wherein said system state information includes at least one of:
   position;
   speed;
   acceleration;
   heading;
   velocity;
   elevation;
   time of transmission;
   time of reception;
   transmit power level;
   receive power level;
   signal to noise ratio (SNR);
   location of system components;
   structure of a host supporting the transmitter or the receiver;
   presence of an obstacle;
   information relating to an obstacle;
   temperature and weather conditions,
   rain sensor information;
   sun sensor information;
   vehicle windscreen wiper rate;
   information available from automotive controller-area network (CAN) bus;
   map data; and
   statistical confidence estimates for any of the above.

7. The method as claimed in claim 1, comprising:
   generating an estimate of the wireless communication channel between the transmitter and the receiver.

8. The method as claimed in claim 7 comprising using at least one additional feature of said estimate of the communication channel induced by the presence of at least one additional inflector to determine at least one said inflector property for said additional inflector.

9. The method as claimed in claim 8 wherein said additional channel feature is a time domain tap in said time domain channel estimate.

10. The method as claimed in claim 1, wherein said step of receiving system state information comprises extracting system state information pertaining to the transmitter from the received input signal.

11. The method as claimed in claim 1, comprising
    deriving additional system state information from the received system state information.

12. The method as claimed in claim 11 wherein additional system state information pertaining to the transmitter is derived at the receiver.

13. The method as claimed in claim 12 wherein said derived input system state information pertaining to the transmitter includes at least one of:
    transmitter speed;
    transmitter acceleration;
    transmitter heading; and
    transmitter velocity.

14. The method as claimed in claim 1, comprising:
    generating an observation, denoted $\Omega$, from at least one of the received input signal and the received system state information, the observation including at least one of:

a point T representing the position of the transmitter;
a point R representing the position of the receiver;
an instantaneous velocity vector $\vec{v}_T$ for the transmitter;
an instantaneous velocity vector $\vec{v}_R$ for the receiver;
a channel estimate h;
a time of the observation τ; and
the received signal.

15. The method as claimed in claim 1, comprising generating observations for use in said estimating wherein said observations relate to at least one of the following cases:
   each of a plurality of received input signals corresponding to multiple transmitted signals separated in time;
   each of a plurality of received input signals corresponding to multiple transmitted signals overlapped in time;
   each of a plurality of channels induced between a transmitter and a receive antenna, in the case of multiple transmitters;
   each of a plurality of channels induced between a transmit antenna and a receive antenna, in the case of multiple receive antennas;
   each of a plurality of channels induced between a transmit antenna and a receive antenna, in the case of multiple transmit antennas.

16. The method as claimed in claim 15 comprising:
grouping multiple observations containing common components to avoid replication of said common components.

17. The method as claimed in claim 1, comprising:
generating at least one hypothesis on future values of the at least one property of the least one inflector.

18. The method as claimed in claim 1, wherein said estimating comprises applying at least one constraint upon at least one property of at least one said inflector.

19. The method as claimed in claim 18 wherein said estimating is constrained such that:

$$T + L_{TP}\vec{u}_{TP} - R + L_{PR}\vec{u}_{PR} = 0$$

where:
T is a point representing the position of the transmitter;
R is a point representing the position of the receiver;
P is a point representing the position of the inflector;

$$\vec{u}_{TP} = \frac{(P-T)}{\|P-T\|_2}$$

is the unit vector in the direction of $\vec{TP}$ $$\vec{u}_{PR} = \frac{(R-P)}{\|R-P\|_2}$$

is the unit vector in the direction of $\vec{PR}$;
$L_{TP} = \|\vec{TP}\|_2$ is the distance between points T and P;
$L_{PR} = \|\vec{PR}\|_2$ is the distance between points P and R; and
$\|.\|_2$ denotes the L2 Norm.

20. The method as claimed in claim 18 wherein said estimating is constrained such that:

$$L_{TP} + L_{PR} - L_{TR} - \Delta t_{12} c = 0$$

where:
$L_{TR} = \|\vec{TR}\|$ is the distance between points T and R;
$\Delta t_{12} = t_2 - t_1$ is a tap delay difference between two time-domain channel taps, from a direct signal propagation path at time $t_1$ and an inflected signal propagation path at time $t_2$, $L_{TP} = \|\vec{TP}\|_2$ is the distance between points T and P; $L_{PR} = \|\vec{PR}\|_2$ is the distance between points P and R; and
c is the speed of light.

21. The method as claimed in claim 20 comprising determining said tap delay difference parameter $\Delta t_{12}$ from an estimate of the communication channel.

22. The method as claimed in claim 21 comprising determining said tap delay difference parameter $\Delta t_{12}$ by measuring a delay difference between taps corresponding to the direct path and inflected path in said estimate of the communication channel in the time domain.

23. The method as claimed in claim 18 wherein said estimating is constrained such that:

$$\vec{v}_T \cdot \vec{u}_{TP} + (\vec{v}_P - \vec{v}_R) \cdot \vec{u}_{PR} + c\frac{w}{w_0} = 0$$

where:
$\vec{v}_T$ is the instantaneous velocity vector for the transmitter;
$\vec{v}_R$ is the instantaneous velocity vector for the receiver;
$\vec{v}_P$ is the instantaneous velocity vector for the inflector;
ω is a frequency offset of the inflected path;
$ω_0$ is the centre frequency of the transmitted signal;

$$\vec{u}_{TP} = \frac{(P-T)}{\|P-T\|_2}$$

is the unit vector in the direction of $\vec{TP}$ $$\vec{u}_{PR} = \frac{(R-P)}{\|R-P\|_2}$$

is the unit vector in the direction of $\vec{PR}$; and
denotes vector dot product.

24. The method as claimed in claim 23, comprising
generating an estimate of the communication channel between the transmitter and the receiver; and
wherein said frequency offset parameter ω is determined from said estimate of the communication channel.

25. The method as claimed in claim 24 wherein said frequency offset parameter ω is calculated from said channel estimate, ĥ, in the time domain, as the rate of change of phase of the tap corresponding to the inflected path relative to that of the tap corresponding to the direct path.

26. The method as claimed in claim 24 wherein calculation of said frequency offset parameter ω from said channel estimate is performed for at least one of the following cases:
   across the duration of said channel estimate;
   across some section of said channel estimate; and
   at intervals through said channel estimate.

27. The method as claimed in claim 18 wherein said estimating is constrained such that:

$$\|\vec{u}\|_2 - 1 = 0; \text{ and}$$

$$\|\vec{u}\|_2 - 1 = 0, \text{ where:}$$

$$\vec{u}_{TP} = \frac{(P-T)}{\|P-T\|_2}$$

is the unit vector in the direction of $\vec{TP}$ $$\vec{u}_{PR} = \frac{(R-P)}{\|R-P\|_2}$$

is the unit vector in the direction of $\vec{PR}$.

28. The method as claimed in claim 18 wherein said constraints are applied across a plurality of observations under some assumption on the position of one or more system components with respect to time, the system components comprising at least one of the inflector, the transmitter, the receiver and a source of system state information.

29. The method as claimed in claim 28 wherein said estimating is constrained across a plurality of observations such that:

$$T[i] + L_{TP}[i]\vec{u}_{TP}[i] + \vec{v}_P(\tau[k]-\tau[i]) - L_{TP}[k]\vec{u}_{TP}[k] = 0$$

where:
bracketed terms indicate an observation index;
τ[i] is the time at which observation i was taken;
τ[k] is the time at which observation k was taken;
T[i] is a point representing the position of the transmitter with respect to observation i;
T[k] is a point representing the position of the transmitter with respect to observation k;

$$\vec{u}_{TP} = \frac{(P-T)}{\|P-T\|_2}$$

is the unit vector in the direction of $\vec{TP}$;
$L_{TP} = \|\vec{TP}\|_2$ is the distance between points T and P; and
$\vec{v}_P$ is the instantaneous velocity vector for the inflector.

30. The method as claimed in claim 18 comprising deriving further constraints for said estimating by differentiating with respect to time.

31. The method as claimed in claim 18 comprising: combining a plurality of said constraints to form a system of equations, and said estimating comprises solving said system using at least one input observation.

32. The method as claimed in claim 18 comprising making a hypothesis on inflector location $\hat{P}[k] = P[i] + \vec{v}_P(\tau[k]-\tau[i])$ at time τ[k], and making a test that this hypothesis satisfies one or more of the constraints using an observation taken at time τ[k], where
τ[i] is the time at which observation i was taken;
τ[k] is the time at which observation k was taken;
$\vec{v}_P$ is the instantaneous velocity vector for the inflector; and
P[i] is the inflector location with respect to observation i.

33. The method as claimed in claim 18 comprising
deriving one or more cost functions from said constraints and
evaluating costs for one or more hypotheses on one or more inflector properties, using at least one input observation, to estimate said inflector property.

34. The method as claimed in claim 33 comprising selecting a set of points to be used as inflector location hypotheses by quantizing a region of the environment.

35. The method as claimed in claim 33 comprising selecting a set of instantaneous velocities as hypotheses for said estimating.

36. The method as claimed in claim 33 comprising combining a plurality of cost functions across at least one input observation.

37. The method as claimed in claim 36 wherein said cost functions are combined across said observations, after dividing said observations into n sets $\Omega_1, \Omega_2, \ldots, \Omega_n$, as follows:

$$C_T = \sum_{i \in \Omega_1} a_{i1} C_1(\Omega[i], \Phi) + \sum_{i \in \Omega_2} a_{i2} C_2(\Omega[i], \Phi) + \ldots + \sum_{i \in \Omega_n} a_{in} C_n(\Omega[i], \Phi),$$

where:
$C_T$ is the total combined cost
i is the observation index;
n is the number of cost functions being applied, and number of observation sets;
$a_{ij}$ is a weight applied to cost function j for observation i;
$\Phi$ hypotheses on one or more inflector properties, assumed constant across all observations in the input set.

38. The method as claimed in claim 37 comprising combining one or more said cost functions across a plurality of input observations occurring at different times.

39. The method as claimed in claim 37 wherein said combination is performed for observations Ω[i] and Ω[k] using the substitution:

$$\hat{P}[i] = \hat{P}[k] - \vec{v}_P(\tau[k]-\tau[i])$$

where:
bracketed terms indicate an observation index;
$\hat{P}[i]$ is hypothesis on the point representing the position of the inflector, corresponding to observation index i;
$\hat{P}[k]$ is hypothesis on the point representing the position of the inflector, corresponding to observation index k;
τ[i] is the time at which observation i was taken; and
τ[k] is the time at which observation k was taken.

40. The method as claimed in claim 33 comprising
applying said cost functions serially; and
reducing the size of a hypothesis set on one or more inflector properties between said serial application of cost functions.

41. The method as claimed in claim 33 comprising:
calculating the cost of a hypothesis using at least one cost function; and
reducing the hypotheses set size by removing at least one member, before applying at least one further cost function.

42. The method as claimed in claim 1 wherein said estimating generates a set of feasible solutions for the inflector property.

43. The method as claimed in claim 42 comprising reducing the set of feasible inflector property solutions using at least one of:
additional constraints; and
additional input observations.

44. The method as claimed in claim 43 wherein the additional observations are provided by at least one of the following:
- reception of at least one more transmitted signal from the same transmitter;
- reception of at least one more transmitted signal from an alternate transmitter; and
- reception of at least one more transmitted signal via at least one more receive antenna.

45. The method as claimed in claim 1 comprising constraining an estimated speed of the inflector.

46. The method as claimed in claim 45 where said constraint on inflector speed comprises at least one of:
- excluding inflector property hypotheses having speed outside of some predefined range;
- excluding inflector property hypotheses according to some distribution controlled by speed;
- applying a higher cost to speeds outside of some predefined range; and
- assigning a cost according to some distribution controlled by speed.

47. The method as claimed in claim 1 comprising constraining the at least one inflector property by considering the inflector to be at least one of:
- a reflector;
- heading in a direction where a path of the inflector is not blocked;
- on some constrained path defined by a map; and
- on a road.

48. The method as claimed in claim 1 comprising:
- generating an output based on said estimated inflector property; and
- providing the output as an input into a connected system.

49. The method as claimed in claim 48 wherein said connected system is at least one of:
- a vehicular system;
- a road-side system; and
- a safety system.

50. The method as claimed in claim 1 wherein said input signal includes the position of the transmitter.

51. An apparatus for estimating an environment surrounding a wireless communication system, the environment including at least one inflector that inflects transmitted signals, the apparatus comprising:
- a first input for receiving an input signal transmitted from a transmitter to a receiver via a wireless communication channel;
- a second input for receiving system state information pertaining to at least one of the receiver, the transmitter and the inflector; and
- an environment estimator for estimating at least one property of the inflector based on the received input signal and the system state information, the at least one property at least partially inducing the wireless communication channel,
- wherein at least one of the transmitter and the receiver is mobile.

52. The apparatus as claimed in claim 51 wherein said input signal includes the position of the transmitter.

53. A system for estimating an environment surrounding a wireless communication system, the environment including at least one inflector that inflects transmitted signals, the system comprising:
- at least one transmitter;
- a receiver that receives an input signal transmitted from the transmitter via a wireless communication channel;
- at least one source of system state information pertaining to at least one of the receiver, the at least one transmitter and the at least one inflector; and
- an environment estimator in data communication with the receiver and the at least one source of system state information for estimating at least one property of the inflector based on the received input signal and the system state information, the at least one property at least partially inducing the wireless communication channel,
- wherein at least one of the transmitter and the receiver is mobile.

54. The system as claimed in claim 53 wherein at least one of the transmitter, receiver and inflector moves.

55. The system as claimed in claim 53 wherein said at least one transmitter and receiver are collocated.

56. The system as claimed in claim 53 wherein said input signal includes the position of the transmitter.

57. A computer program product comprising machine readable program code recorded on a non-transitory machine-readable recording medium, for controlling the operation of a data processing apparatus on which the program code executes to perform a method for estimating an environment surrounding a wireless communication system, the environment including at least one inflector that inflects transmitted signals, the method comprising:
- receiving an input signal transmitted from a transmitter to a receiver via a wireless communication channel;
- receiving system state information pertaining to at least one of the receiver, the transmitter and the inflector; and
- estimating at least one property of the inflector based on the received input signal and the system state information, the at least one property at least partially inducing the wireless communication channel,
- wherein at least one of the transmitter and the receiver is mobile.

58. The computer program product as claimed in claim 57 wherein said input signal includes the position of the transmitter.

* * * * *

UNITED STATES PATENT AND TRADEMARK OFFICE
CERTIFICATE OF CORRECTION

PATENT NO. : 9,008,584 B2  Page 1 of 1
APPLICATION NO. : 13/379295
DATED : April 14, 2015
INVENTOR(S) : Alexander et al.

It is certified that error appears in the above-identified patent and that said Letters Patent is hereby corrected as shown below:

Specification

In column 11, line 62, delete "$\Delta t_{12}=t_2$." and insert --$\Delta t_{12}=t_2-t_1$.--, therefor

Claims

In column 19, line 5, in Claim 14, delete "h;" and insert --$\hat{h}$;--, therefor In column 24, line 30-31, in Claim 57, delete "machine readable" and insert --machine-readable--, therefor Signed and Sealed this
Twenty-fourth Day of November, 2015

Michelle K. Lee
*Director of the United States Patent and Trademark Office*